(12) United States Patent
Escobedo

(10) Patent No.: US 9,641,745 B2
(45) Date of Patent: May 2, 2017

(54) SYSTEMS, METHODS, AND COMPUTER PROGRAM PRODUCTS FOR DIGITAL IMAGE CAPTURE

(71) Applicant: PayPal, Inc., San Jose, CA (US)

(72) Inventor: Miguel Angel Escobedo, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/850,547

(22) Filed: Sep. 10, 2015

(65) Prior Publication Data

US 2015/0381884 A1 Dec. 31, 2015

Related U.S. Application Data

(63) Continuation of application No. 14/538,419, filed on Nov. 11, 2014, now Pat. No. 9,167,136, which is a (Continued)

(51) Int. Cl.
*H04N 5/225* (2006.01)
*H04N 5/232* (2006.01)
(Continued)

(52) U.S. Cl.
CPC ....... *H04N 5/23216* (2013.01); *H04N 1/2145* (2013.01); *H04N 5/225* (2013.01);
(Continued)

(58) Field of Classification Search
CPC ........... H04N 5/23216; H04N 5/23206; H04N 5/23245; H04N 5/225; H04N 1/2145; H04N 21/482; H04N 21/4223; H04N 5/772; H04N 7/147; H04N 21/47217; H04N 21/8153; H04N 21/4334; H04N 5/44543; H04N 5/23293
(Continued)

(56) References Cited

U.S. PATENT DOCUMENTS

| 8,941,770 B2* | 1/2015 | Kim | H04N 5/262 348/231.3 |
| 2007/0206917 A1* | 9/2007 | Ono | G11B 27/005 386/220 |

(Continued)

OTHER PUBLICATIONS

"Learn About Continuous Shooting", SNAPSORT—Learn website, accessed on Sep. 27, 2012, from http.//snapsort.com/learn/continuous-shooting/fps, 5 pages, date unknown.

*Primary Examiner* — Yogesh Aggarwal
(74) *Attorney, Agent, or Firm* — Haynes and Boone, LLP

(57) ABSTRACT

A method of editing a digital image is provided herein. The method includes displaying a first image in a user interface presented in a display of a user device, receiving a selection of an edit area of the first image, and displaying a portion of a second image of a plurality of still images in the edit area of the first image. Each of the plurality of still images is captured in succession adjacent to the first image. The method further includes replacing the edit area of the first image with the portion of the second image to generate a modified image and storing the modified image in memory as an image file. Associated systems and computer program products are also provided herein.

20 Claims, 9 Drawing Sheets

Related U.S. Application Data continuation of application No. 13/630,883, filed on Sep. 28, 2012, now Pat. No. 8,913,147.

(51) Int. Cl.
| | |
|---|---|
| *H04N 5/445* | (2011.01) |
| *H04N 5/77* | (2006.01) |
| *H04N 7/14* | (2006.01) |
| *H04N 21/4223* | (2011.01) |
| *H04N 21/433* | (2011.01) |
| *H04N 21/472* | (2011.01) |
| *H04N 21/482* | (2011.01) |
| *H04N 21/81* | (2011.01) |
| *H04N 1/21* | (2006.01) |
| *H04N 101/00* | (2006.01) |

(52) U.S. Cl.
CPC ..... *H04N 5/23206* (2013.01); *H04N 5/23245* (2013.01); *H04N 5/23293* (2013.01); *H04N 5/44543* (2013.01); *H04N 5/772* (2013.01); *H04N 7/147* (2013.01); *H04N 21/4223* (2013.01); *H04N 21/4334* (2013.01); *H04N 21/47217* (2013.01); *H04N 21/482* (2013.01); *H04N 21/8153* (2013.01); *H04N 2005/44556* (2013.01); *H04N 2101/00* (2013.01); *H04N 2201/3247* (2013.01); *H04N 2201/3274* (2013.01)

(58) Field of Classification Search
USPC .............. 348/220.1, 333.01, 333.05, 333.11, 348/333.13, 376
See application file for complete search history.

(56) References Cited

U.S. PATENT DOCUMENTS

| | | | |
|---|---|---|---|
| 2011/0200259 A1* | 8/2011 | Lindskog | G06T 11/00 382/201 |
| 2012/0147220 A1* | 6/2012 | Lee | H04N 9/8227 348/231.99 |
| 2012/0249853 A1 | 10/2012 | Krolczyk et al. | |
| 2012/0300092 A1* | 11/2012 | Kim | H04N 1/215 348/222.1 |
| 2015/0062361 A1 | 3/2015 | Escobedo | |

* cited by examiner

SYSTEMS, METHODS, AND COMPUTER PROGRAM PRODUCTS FOR DIGITAL IMAGE CAPTURE

PRIORITY

This application is a continuation of U.S. application Ser. No. 14/538,419 filed Nov. 11, 2014, titled "Systems, Methods, and Computer Program Products for Digital Image Capture," which is a continuation of U.S. application Ser. No. 13/630,883 filed Sep. 28, 2012, titled "Systems, Methods, and Computer Program Products For Digital Image Capture", now U.S. Pat. No. 8,913,147, the entire disclosures of which are hereby incorporated by reference in their entirety.

BACKGROUND

Technical Field

The present disclosure generally relates to digital imaging, and more particularly, to techniques for capturing and selecting digital images.

Related Art

Recent advances in the fields of telecommunications and integrated circuits have drastically increased the popularity of portable electronic telecommunication devices. As some non-limiting examples, these portable telecommunication devices may include smart phones, computer tablets, or laptops. Users of these devices may use them to perform a variety of tasks. For example, many smart phones and computers allow users to take digital pictures, edit digital pictures, and then send or otherwise export digital pictures. In one example, a user may have an application on a mobile device that allows the user to take a digital picture, edit or otherwise manipulate the digital picture, and then post the digital picture to a social media site.

Taking photographs of people or scenes can sometimes be a frustrating experience. For instance, people blink or move and scenes can change. Thus, human users often find that a photograph of a scene does not capture the subject matter in an optimal way. One solution is to press a capture button the device multiple times to take multiple pictures, where each picture may be separated by one second or more from a subsequent picture. However, this can be time consuming, and asking people to sit through multiple attempts may reduce the spontaneity of a scene.

DETAILED DESCRIPTION

Figure 1:
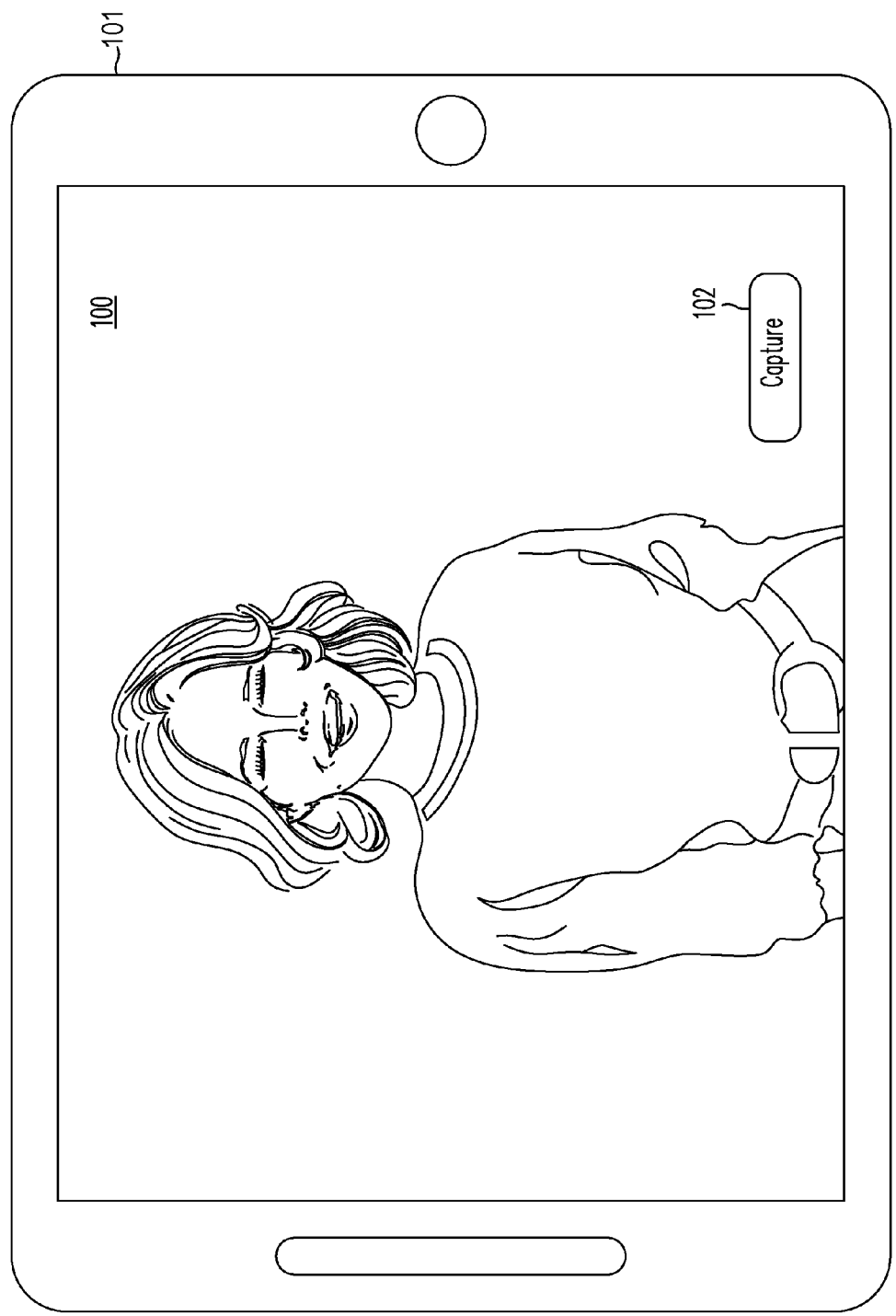
FIGS. 1, 2, 3, and 4 illustrate example user interfaces of an example application program according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to the various aspects of the present disclosure, a method, system, and computer program product are discussed below that allow a user select a desired still image from multiple still images.

By using the video capabilities on a mobile device instead of just the still photograph functionality, a short continuous cache can be maintained and saved as the "photo" each time the shutter is pressed. The cache includes multiple still images, and the user can scrub back into the cache to select a moment that represents a better or best image and save it as the still photograph.

In one example, when a user captures an image, the mobile device stores a short video (e.g., about one second). By default, the last frame of the video is presented to the user as the nominal image, and the mobile device allows for the user to scrub back through the video and select another frame as the nominal image. The user can then print or export the nominal image, just as the user would with any other image.

In some embodiments, the cache is maintained in its original state so that other images can be generated from it at a later time. In some embodiments, the nominal image is stored in a photo folder, where metadata for a given image associates the image with the video from which it was selected. The collections of still images or frames that make up the videos may be stored in any appropriate manner. For instance, each short video may be saved as its own file or may be saved to a common cache, where metadata in an image file points to a location in the cache that corresponds to the video. Furthermore, in some embodiments, each image frame of the video may be its own stand-alone image, whereas in other embodiments a particular frame may include information describing a difference between that frame and a previous frame.

In another example, the user selects an image capture option in rapid succession with less time between the image captures than the full time of an underlying video. For instance, a user may select image capture options with 0.70 seconds between selections, whereas the underlying videos may have a default time of one second. In such a scenario, the first few frames of the cache data of a subsequent image can simply be copied from the video cache of the previous image. Such a feature may allow a user to capture images as fast as desired without having to wait between image captures for the full video time to elapse.

In yet another example, the user captures an image of a fairly complex scene, such as a group of people or a landscape. For such complex shots, the user can select multiple spots in the cache timeline and set those to specific regions of the image. This, for example, will allow the user to set a region around each subject person's face and find a spot in the cache for each when the subject's eyes are open.

Logic may be included in the device to make the background portions around a face region consistent.

In one specific use example, a user takes a photo of a baby doing something cute. Upon reviewing the image, the shot appears ruined since the baby blinked at the last moment. The user then scrubs back in the image cache to find a better image. About a half second back the user sees just the right face the baby was making, and the baby's eyes are open. The user proceeds to select the desired photo as the nominal image and sends it off to grandma and grandpa via email or social media.

Various embodiments may be included in any kind of mobile device, such as a smartphone, a tablet computer, a laptop computer, digital camera, and/or the like. In some embodiments, the above-described functionality is included in an application that is downloaded to the user's device. Though in other embodiments, some or all of the functionality may be included in one or more network servers in communication with the user's mobile device, where the network servers store the caches and provide the ability to scrub through a cache to modify or replace an image as desired. In fact, the scope of embodiments includes any configuration, whether localized to the mobile device or distributed to one or more other processing devices.

Various embodiments include, among other things, methods in accordance with the description above, as well as computer systems for performing the method. The examples below provide a detailed illustration of several example embodiments.

FIG. 1 illustrates an example user interface 100 for a portable electronic device adapted according to one embodiment. In the illustrated embodiment, the portable electronic device is a smart phone. In alternative embodiments, the portable electronic device may be another suitable electronic device such as a computer tablet or a laptop. A user may download application software programs, also known as "apps" or "applications" to the portable electronic device. In general, applications are computer software programs designed to execute specific tasks. As examples, both Apple's® App Store and Google's® Android Market offer a multitude of applications, including entertainment programs, business programs, file management tools, and other widgets, etc.

Interface 100 is an example of an interface seen by a user when capturing images according to the present disclosure. Interface 100 may be embodied in any appropriate manner, such as on a touch screen interface or another Graphical User Interface (GUI) that uses a mouse or other pointing device.

FIG. 1 starts off after the consumer has already launched a photo application on device 101 and has a subject chosen. For instance, the image shown in FIG. 1 may be from a preview video, where the user may select the capture button 102 (e.g., by touching the button) at a chosen time to take a photo of the subject at that moment.

The application then saves the captured image and also keeps some video data in memory. For the purposes of this discussion, the image that is presented to the user as the captured image is referred to as the nominal image. In some examples, the amount of video data that is retained and associated with the nominal image is 1.0-1.5 seconds worth, though any appropriate amount of video data may be saved in various embodiments. In many applications, the video functionality of the mobile device 101 takes between 24 and 36 frames per second. Therefore, at video speed, the application may cache between 24 and 36 frames for a 1-second video in this example.

If the user captures the image shown in FIG. 1, the user may be less than satisfied, since the subject has his eyes closed. However, the application running on the mobile device 101 in this example provides a way for the user to select a different frame from the video and replace or modify the nominal image with the selected frame.

Figure 2:
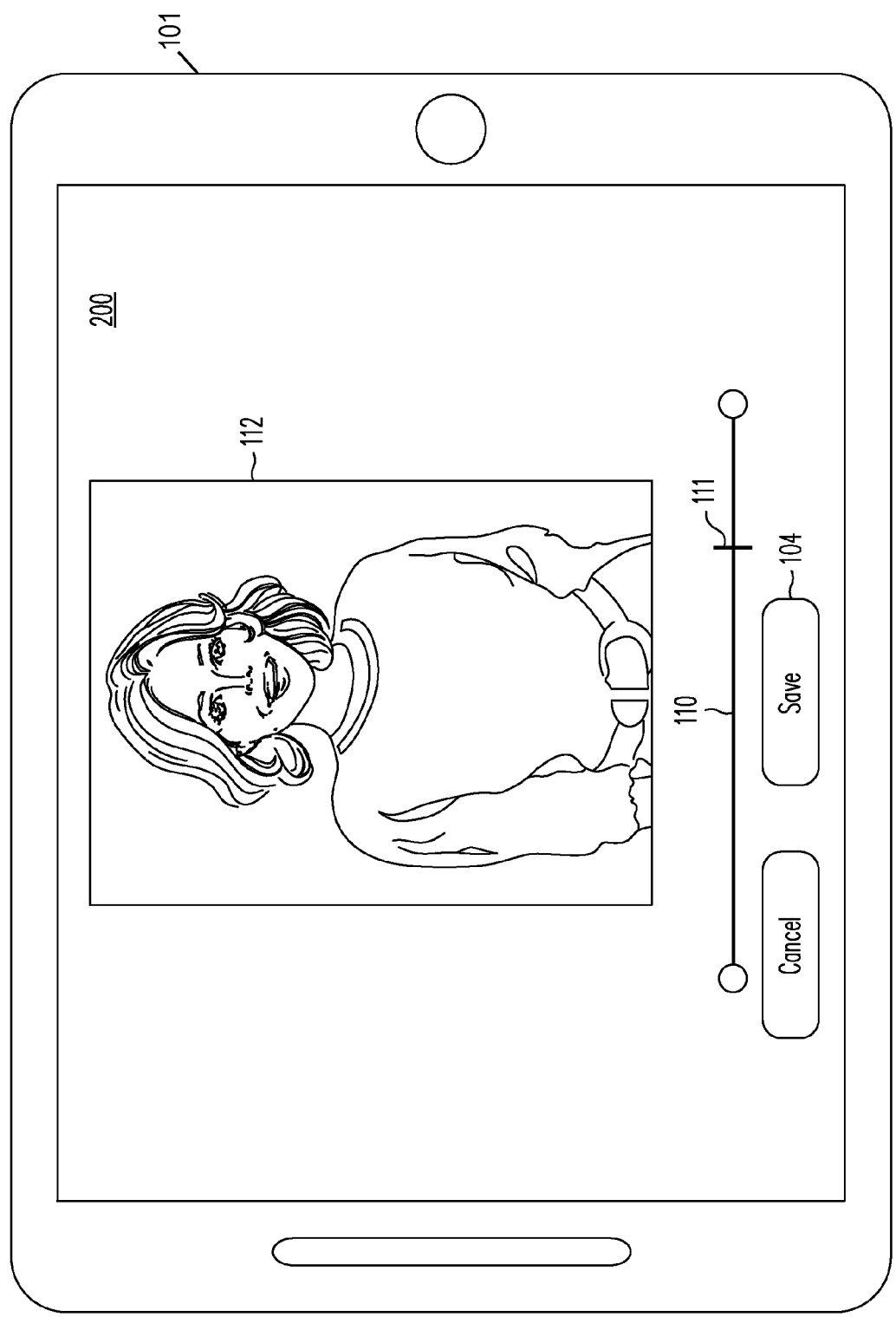

Moving to FIG. 2, the user has opened a picture editing interface 200 within the application. Picture editing interface allows the user to scrub through the video frames in the cache using control bar 110. The user can move marker 111 along control bar 110 to choose an instant within the video cache that may provide a more desirable image than the current nominal image. Display 112 shows the frame that corresponds to the placement of marker 111. The user can select the image shown in display 112 by selecting save button 104. The application then replaces the first nominal image with the selected image. In some embodiments, the application may automatically update a photo file system to replace the nominal image with the desired image, thereby providing the user with a seamless selection of a still image from a video. The user can then view or export the selected image, such as by uploading the image to a social media site or attaching the image to a text message or email.

The user may capture multiple images successively, where the application stores the nominal images to a photo file system and saves the respective videos to the cache. The user may then edit or replace the nominal images at a later time. As explained in more detail with respect to FIG. 5, each video may be its own independent file or folder or may be saved as blocks in a shared cache structure.

Figure 3:
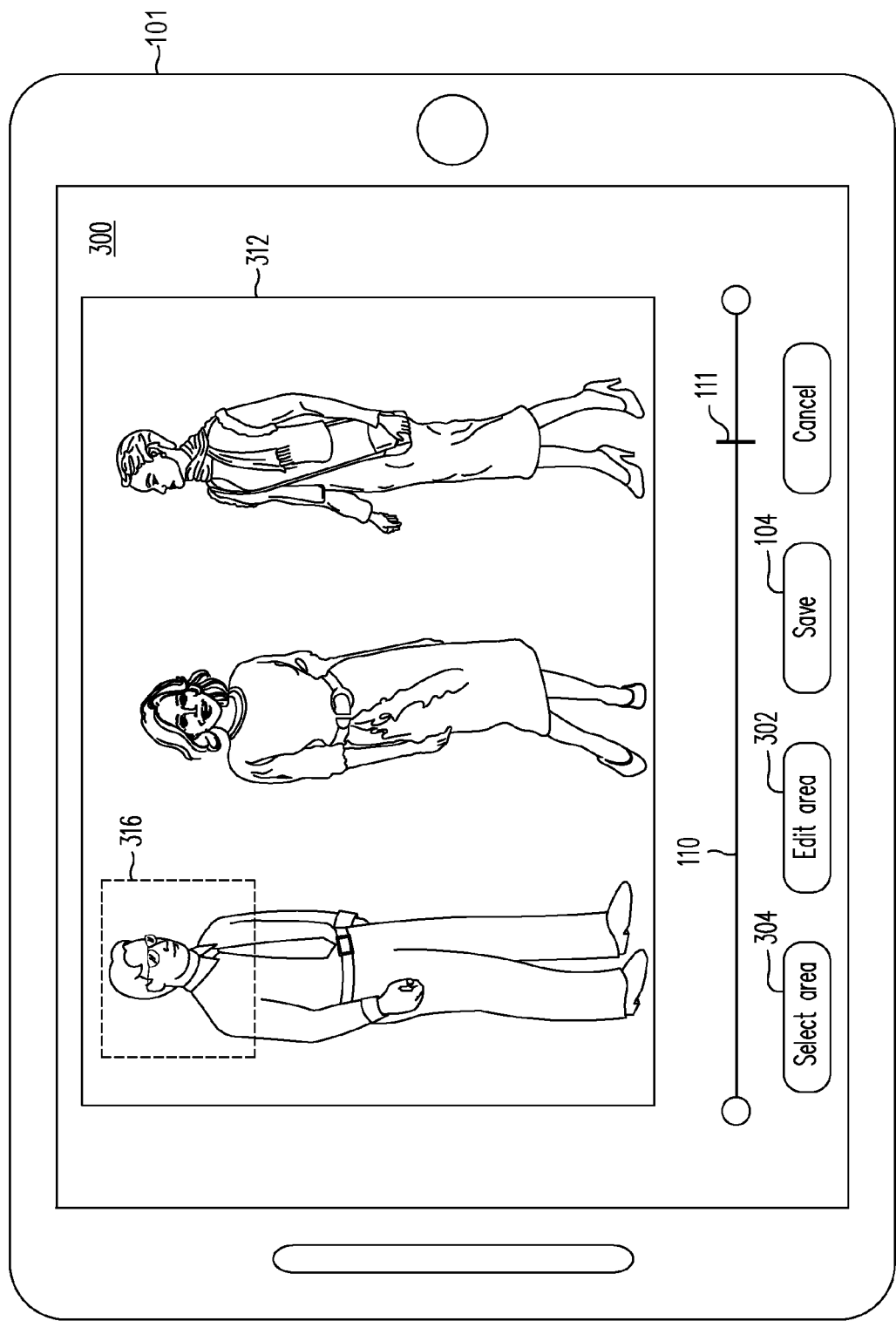
Figure 4:
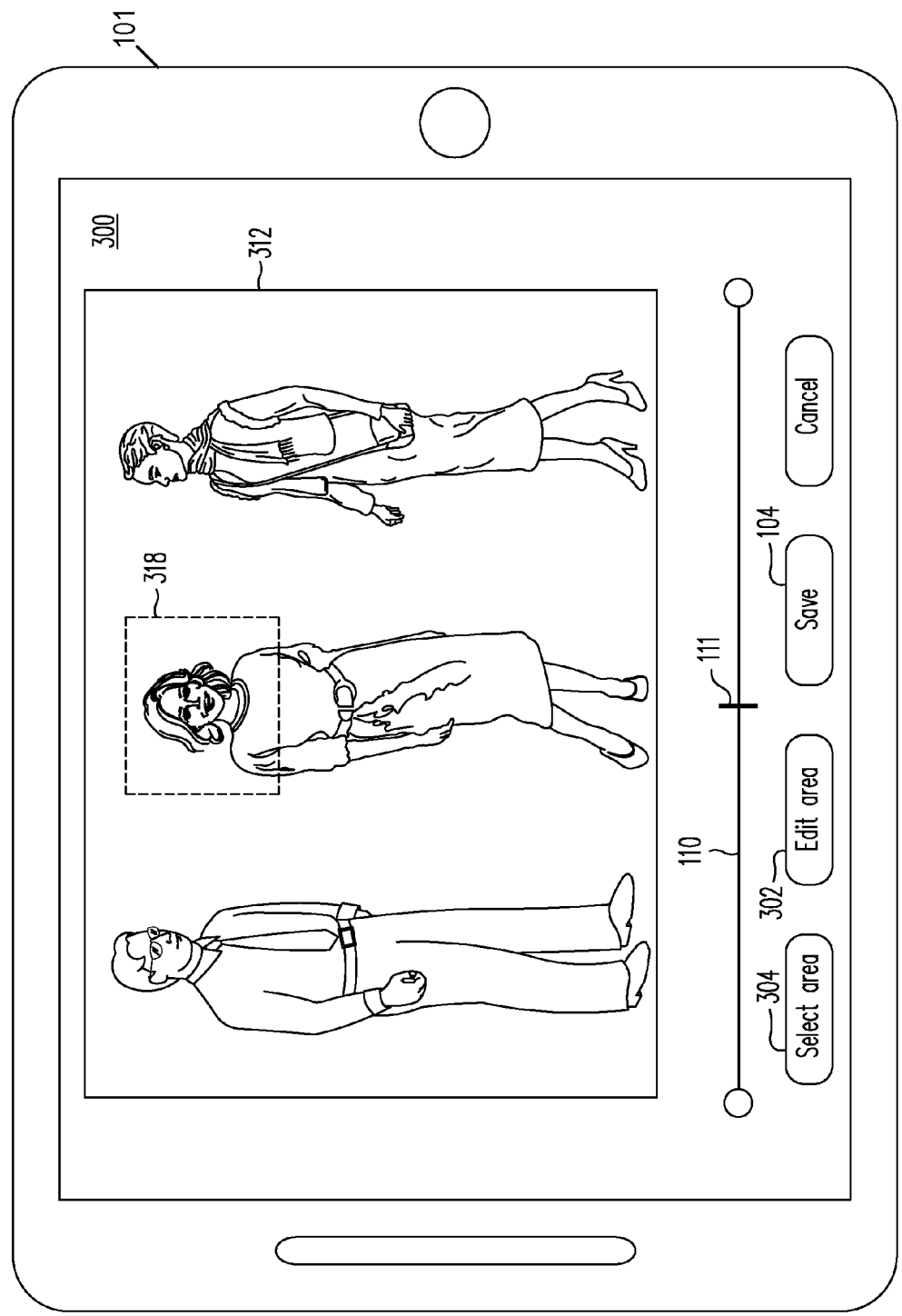

The embodiment of FIGS. 1 and 2 shows a user replacing a nominal image with a desired image, and the scope of embodiments also includes those shown in FIGS. 3 and 4, where a user modifies one or more portions of a nominal image with one or more selected portions from the video cache.

FIG. 3 shows a scenario that assumes a user has already captured an image and is using interface 300 to edit that image. Display 312 shows the nominal image, and control bar 110 and marker 111 work similarly to that described with respect to FIG. 2.

The user selects the select area button 304 and then indicates an area of display 312 to edit. For instance, a user may trace area 316 with a finger or simply tap the left-most subject's face to cause area 316 to be selected. As the user moves marker 111, the area 316 shows the appearance of area 316 within a corresponding frame of the video cache. For instance, if the left-most subject's eyes are closed, the user may scrub through the cache to find an image of the subject with his or her eyes open. The user may then edit area 316 by selecting the edit area button 302.

Of course, it may not desirable to simply replace area 316 with a corresponding area from a previous frame. For example, slight camera movement or movement by the subject may cause the visible background within area 316 to slightly differ between frames or may cause a portion of the subject's body to not line up exactly at the border of area 316. Thus, some embodiments may include intelligence or smoothing algorithms to correct such details.

FIG. 4 shows a scenario in which the user also edits area 318 in a manner similar to that described in FIG. 3. Thus, the user may edit area 316 and area 318 independently of each other. Similarly, the user may also edit area 316 and 318 by adopting subject matter from different frames within the video cache. Therefore, different areas 316, 318 may include different, respective modifications. Although not shown in the Figures, it is understood that the user may also edit the right-most subject in the display 312, if desired. In fact, the user may edit any arbitrary portion of display 312.

Furthermore, the embodiments described with respect to FIGS. 1-4 are not limited to portraits of people. Video frames of any subject matter may be used in various embodiments.

It is understood that the layout for interfaces 100, 200, and 300 are for example only, and in various embodiments an image capture or editing interface may include any appropriate technique to capture an image and edit or replace the image.

Figure 5:
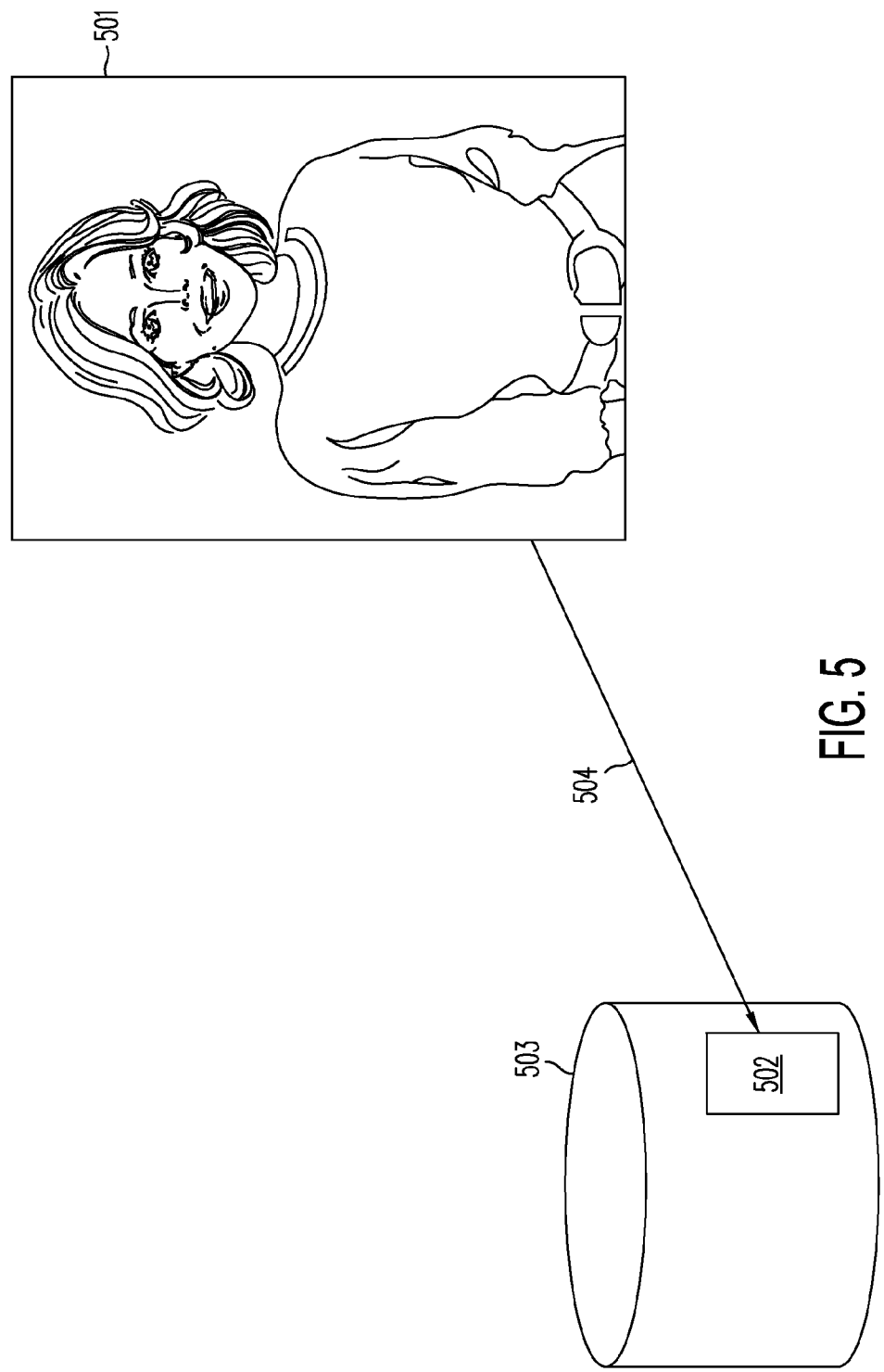
FIG. 5 is a conceptual representation of storage of the still image file and video cache according to one example embodiment.

FIG. 5 is a conceptual representation of storage of the still image file 501 and video cache 502 according to one example embodiment. In FIG. 5, the image file 501 of the nominal image is saved as a conventional image would be saved—as a stand-alone file that can be exported. The video cache 502 is saved in memory structure 503, which may be in the same or different memory device or in the same or different folder in memory as image file 501.

In one example, metadata pointer 504 in image file 501 points to video cache 502, thereby associating video cache 502 with image file 501. Additionally or alternatively, metadata in cache 502 or memory structure 503 may point to image file 501. Any appropriate technique to associate image file 501 with video cache 502 may be used in various embodiments. Furthermore, once a user has edited and saved an image file, the system may delete video cache 502 to save space or may keep video cache 502 for any appropriate time and allow the user to make different changes later.

Video cache 502 may be saved in memory structure 503 in any appropriate manner. For instance, video cache 502 (which includes a multitude of still image frames) may be its own file and may be stored as such in memory structure 503. In another example, memory structure 503 stores video cache 502 as blocks rather than as files and uses pointers to associate blocks of a particular video cache with one or more respective image files.

Figure 6:
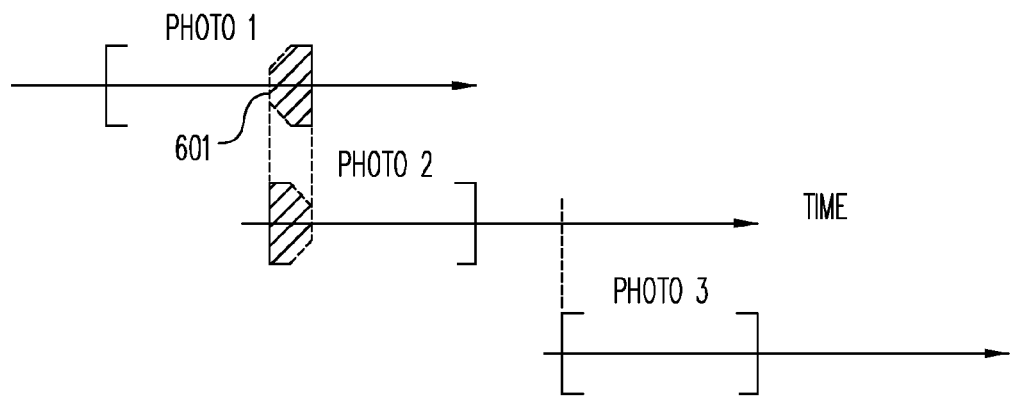
FIG. 6 is an illustration of three still images captured in rapid succession of the same scene, according to one example embodiment.

FIG. 6 is an illustration of three still images (photo 1, photo 2, and photo 3) captured in rapid succession of the same scene, according to one example embodiment. In the example of FIG. 6, each video cache is a designated length, e.g., one second. However, photo 2 was captured less than one second after photo 1 was captured. In this embodiment, the application automatically builds up the video cache of photo 2 to be a full one second by copying portion 601 from the video cache of photo 1 and including it in the video cache of photo 2. Further in this example, photo 3 is taken in rapid succession as well but is captured more than one second after photo 2 is captured. Therefore, FIG. 6 does not illustrate such automatic copying with respect to photo 3.

Continuing with the present example, in another embodiment in which the video caches are stored as blocks rather than individual files, the application may use pointers to associate portion 601 with both photo 1 and photo 2, rather than copying portion 601. The embodiment of FIG. 6 allows the user to capture images in rapid succession without having to wait for the full cache time period between image captures. In other embodiments, the application may simply leave photo 2 with a cache less than one second. Any appropriate technique to allow rapid succession image capture is within the scope of embodiments.

Figure 7:
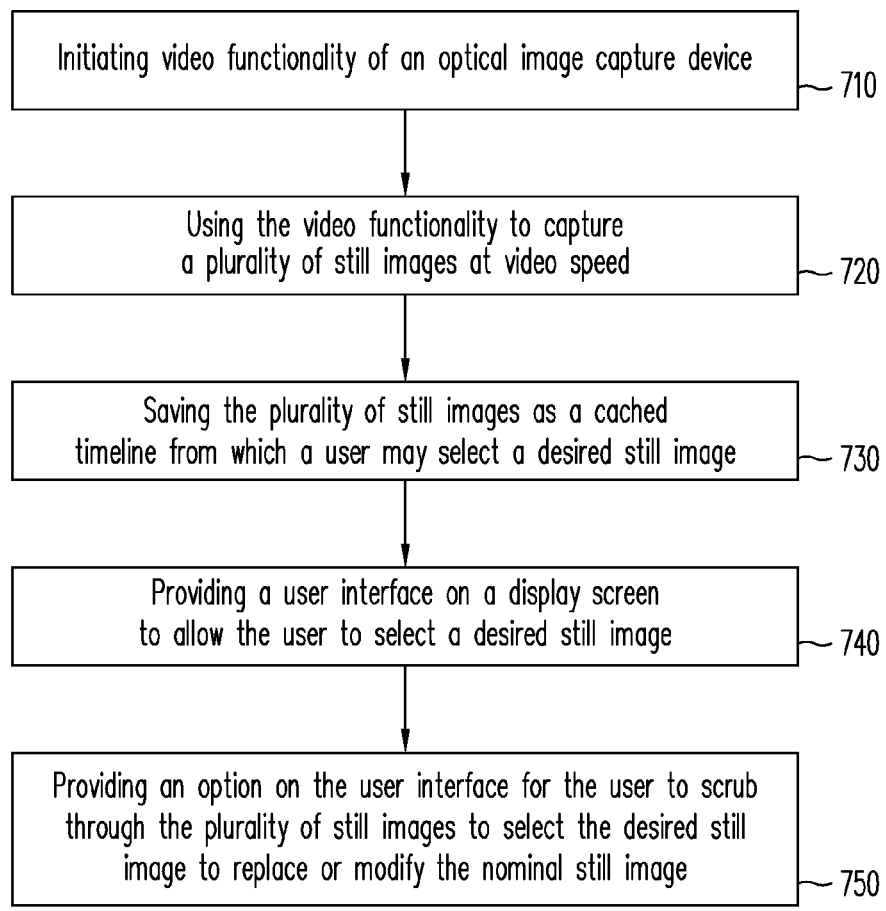
FIG. 7 illustrates a flowchart containing example process flows according to various aspects of the present disclosure.

FIG. 7 is an illustration of method 700, adapted according to one embodiment, to provide advanced image capture according to the examples above. The actions of FIG. 7 may be performed by an application on a processor-based device with a camera, by functionality in an operating system of a processor-based device, by hardware or firmware, or a combination thereof. In some embodiments, the various actions are carried out by one or more computer processors executing computer code to provide the described functionality.

Furthermore, the actions below are described with respect to a user's processor-based device (e.g., smartphone, tablet, digital camera), but it is understood that some of the actions may be distributed to a cloud-based processing/storage resource. For instance, the user's device may upload images to the cloud and may use a cloud-based resource to replace or modify images and to export images.

In action 710, video functionality of an optical image capture device is initiated. For instance, a smartphone with a built-in camera may run a software application that operates the camera and presents interface 100 (FIG. 1). Whether the user is aware or not, the application is using a video functionality, even if the user has selected a still image (rather than video) option.

The application uses the video functionality to capture a plurality of still images at video speed at action 720. For instance, as mentioned above, conventional video usually captures 24 or 36 frames per second. Various embodiments may capture frames at any appropriate rate that, if played back at-speed, provides the illusion of moving images.

Action 720 may include capturing frames before the user selects the capture image option. For example, as the application is running, it may capture video frames and place them in a first-in-first-out (FIFO) buffer that holds, for instance, 1.0-1.5 seconds of video. When the user selects the capture image option, the application moves the buffered frames to a different memory structure, such as memory structure 503 (FIG. 5).

Continuing with the example, in action 730, the application saves the plurality of still images as a cached timeline from which the user may select a desired still image. An example of an image cache is described above with respect to FIG. 5. The frames are stored so that they can be retrieved and presented in a chronological order, e.g., stored in a memory structure that has order, such as a FIFO structure, and/or saved with metadata that allows the frames to be ordered as they are read. Action 730 may also include saving the last frame (or some other frame) as a nominal still image with the cached video frames treated as metadata associated with the nominal still image. The user may open a photo folder and see the nominal still image.

In action 740, the application provides a user interface on a display screen to allow the user to select a desired still image. Examples include interfaces 200 and 300 (FIGS. 2-4), which include a control bar and marker that allow a user to select a frame from the cached timeline. The scope of embodiments is not limited to the interfaces of FIGS. 1-4, as any appropriate interface may be used. In other embodiments, such as a configuration that uses cloud-based processing/storage resources, the interfaces discussed at actions 740, 750 may be provided to the user on a device different from the device that captured the images.

In action 750, the application provides an option on the user interface for the user to scrub through the plurality of still images to select a desired still image to replace or modify a nominal still image. For instance, the discussion of FIG. 2 provides an example in which a user replaces one nominal still image with another. The discussion of FIGS. 3 and 4 provides an example in which a user modifies one or more areas of a nominal still image with portions of other still images in the video cache. During scrubbing, the user may scroll through the images in a chronological order, forward and/or backward, to identify selected images from the video cache.

The scope of embodiments is not limited to the particular flow shown in FIG. 7. Rather, other embodiments may add, omit, rearrange, or modify one or more actions in accordance with a given design. For instance, some embodiments may provide additional functionality, such as digital touching up and other effects for selected images. Other embodiments may add features, such as integration with social media sites and the like.

Figure 8:
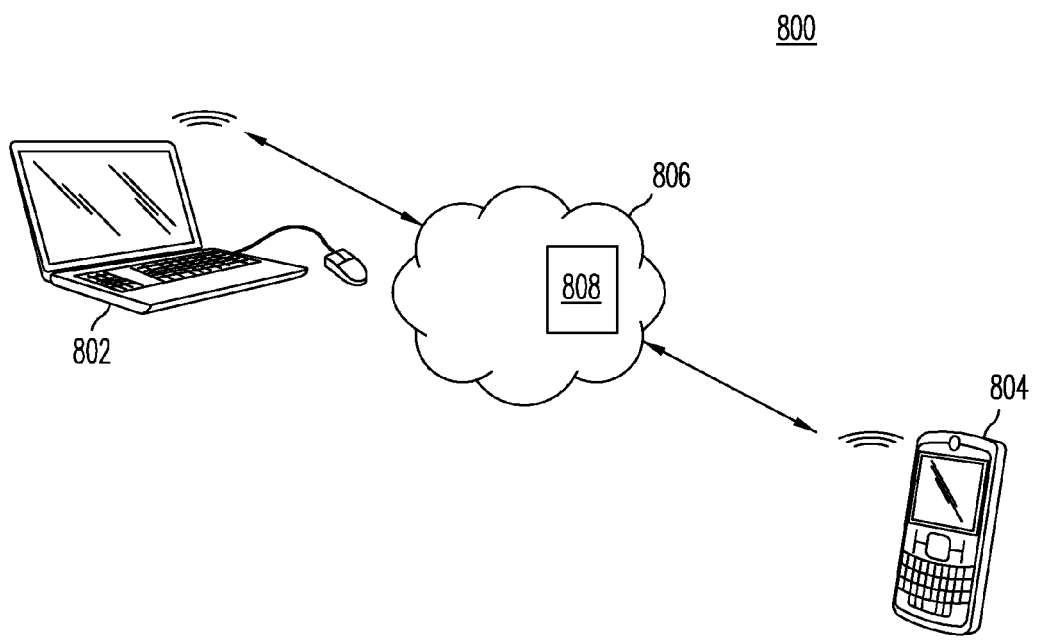
FIG. 8 illustrates an example computer system, including a network, on which users and merchants interact with each other and with cloud-based resources.

FIG. 8 is an illustration of an example computer system 800, adapted according to one embodiment. Computer system 800 includes mobile device (including a camera, not shown) 804 and personal computer 802 (which may include a camera), both connected to a computer network 806 (e.g., the Internet). In one example, the consumer has mobile device 804, which runs software to provide an app with the functionality described above with respect to FIGS. 1-6.

Mobile device 804 is in communication with cloud-based resources 808, which may include one or more computers, such as server computers, with adequate memory resources to handle requests from a variety of users. A given embodiment may divide up the functionality (described above in FIG. 7) between mobile device 804 and resources 808 in any appropriate manner. For example, the app on mobile device 804 may capture images and video and then upload those images and video, with the majority of the processing and storing may be performed by resources 808. The user may then replace or modify the images using an interface on either mobile device 804 or personal computer 802. However, other divisions of responsibility are also possible in various embodiments.

Computer system 800 also includes personal computer 802 in communication with cloud based resources 808. In one example, a user may access information from the cloud-based resources 808 by logging on to an online account at computer 802. The various components of computer system 800 are shown as examples only. For instance, a given user may access the resources 808 by a number of devices, not all of the devices being mobile devices.

Figure 9:
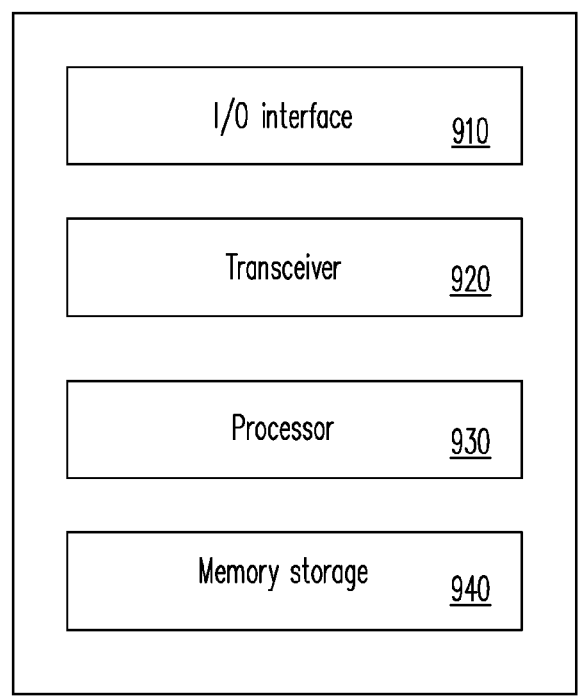
FIG. 9 illustrates a block diagram of a computer system for implementing various methods and devices described according to various aspects of the present disclosure.

FIG. 9 is a simplified block diagram of an example electronic device 900 on which the application (accessed by the user) may be implemented according to various aspects of the present disclosure. The electronic device 900 may be a portable personal electronic device, such as a smart phone, laptop, or a tablet. The electronic device 900 includes an input/output interface 910. The interface 910 is operable to receive an input from a user and communicate an output to the user. In an embodiment, the input/output interface 910 includes a visual display unit, for example a touch-sensitive screen. Input/output interface 910 may display a graphical interface, such as interfaces 100, 200, 300 of FIGS. 1-4.

The electronic device 900 includes a transceiver 920. The transceiver 920 is operable to electronically communicate with external devices. In an embodiment, the transceiver 920 is operable to wirelessly communicate with cellular towers or other network access points and infrastructure. The electronic device 900 also includes a computer processor 930 that is operable to execute computer instructions and a memory storage 940 that is operable to store the computer instructions.

The memory storage 940 also contains a program module that is an embodiment of the application that interacts with the user and, when appropriate, cloud-based resources. The program module operates to provide actions, such as capturing images, providing a user interface, and the like.

Figure 10:
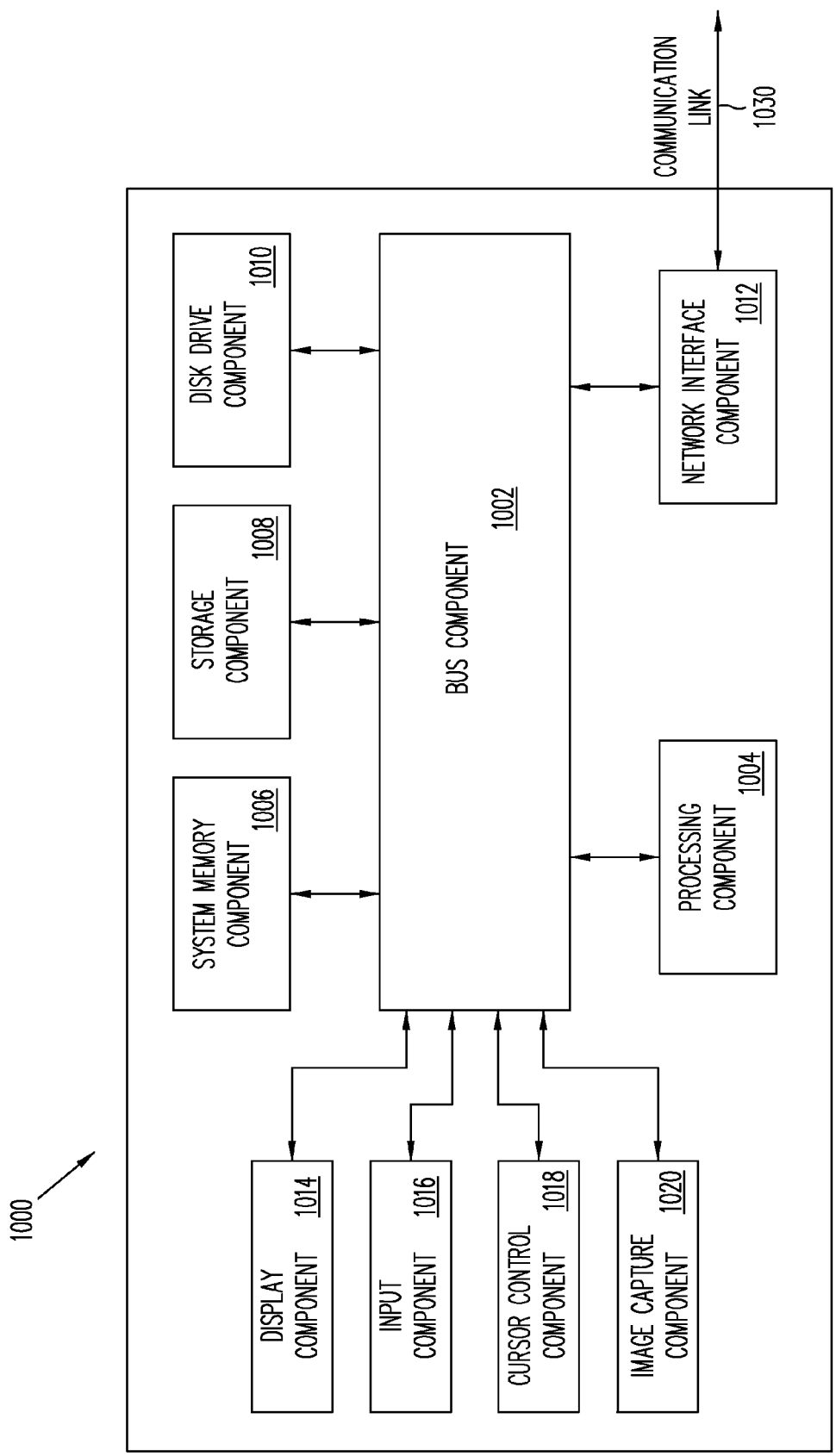
FIG. 10 illustrates a block diagram of a computer system for implementing various methods and devices described according to various aspects of the present disclosure.

FIG. 10 is a block diagram of a computer system 1000 suitable for implementing various methods and devices described herein, for example, the various method blocks of the method 700. For example, the computer system 1000 may represent a computer upon which the consumer sees interfaces 100, 200, 300. In another example, the computer system 1000 may represent a server computer or other type of computer that can be used as part of a cloud infrastructure to provide cloud processing/storage. Accordingly, it should be appreciated that each of the devices may be implemented as the computer system 1000 for communication with a network in a manner as follows.

In accordance with various embodiments of the present disclosure, the computer system 1000, such as a mobile communications device and/or a network server, includes a bus component 1002 or other communication mechanisms for communicating information, which interconnects subsystems and components, such as processing component 1004 (e.g., processor, micro-controller, digital signal processor (DSP), etc.), system memory component 1006 (e.g., RAM), static storage component 1008 (e.g., ROM), disk drive component 1010 (e.g., magnetic or optical), network interface component 1012 (e.g., modem or Ethernet card), display component 1014 (e.g., touch-screens or liquid crystal display (LCD)), input component 1016 (e.g., keyboard or touch-sensitive components operable to detect a touch by a human body), cursor control component 1018 (e.g., mouse or trackball), and image capture component 1020 (e.g., analog or digital camera). In one implementation, disk drive component 1010 may comprise a database having one or more disk or solid-state drive components.

In accordance with embodiments of the present disclosure, computer system 1000 performs specific operations by processor 1004 executing one or more sequences of one or more instructions contained in system memory component 1006. Such instructions may be read into system memory component 1006 from another computer readable medium, such as static storage component 1008 or disk drive component 1010. In other embodiments, hard-wired circuitry may be used in place of (or in combination with) software instructions to implement the present disclosure.

Logic may be encoded in a computer readable, non-transitory medium, which may refer to any medium that participates in providing instructions to processor 1004 for execution. Such a medium may take many forms, including but not limited to, non-volatile media and volatile media. In various implementations, non-volatile media includes optical or magnetic disks, such as disk or solid-state drive component 1010, and volatile media includes dynamic memory, such as system memory component 1006.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1000. In various other embodiments of the present disclosure, a plurality of computer systems 1000 coupled by communication link 1030 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (i.e., application code) through communication link 1030 and communication interface 1012. Received program code may be executed by processor 1004 as received and/or stored in disk drive component 1010 or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An image editing system comprising:
an input/output interface operable to receive an input from a user and communicate an output to the user;
a computer processor operable to execute instructions; and
a memory storage operable to store the instructions that, in response to execution by the computer processor, cause the image editing system to perform operations comprising:
capturing a plurality of still images using a successive image capturing process;
displaying a first image of the plurality of still images in a user interface presented in a display of a user device;
receiving a selection of an edit area of the first image, wherein the edit area is smaller than a total area of the first image;
successively displaying, in the edit area of the first image, a corresponding portion of each of multiple images of the plurality of still images; and
in response to a selection of a first corresponding portion of the corresponding portion of each of the multiple images, replacing the edit area of the first image with the first corresponding portion to generate a modified image, the first corresponding portion corresponding to a second image of the plurality of still images.

2. The image editing system of claim 1, wherein the input/output interface comprises a display having touch-sensitive components to receive the input from the user and configured to display a graphical user interface to the user as the output.

3. The image editing system of claim 1, wherein the operations further comprises:
receiving an indication that that user has selected a capture button included in the input/output interface; and
capturing the plurality of still images in the successive image capturing process, using an optical image capture device, in response to receipt of the indication that the user has selected the capture button.

4. The image editing system of claim 1, wherein the input/output interface is further operable to cause the system to enable selection of any image of the plurality of still images as the second image.

5. The image editing system of claim 1, wherein the operations further comprise causing the system to detect, by touch-sensitive components of the input/output interface, a tap on a location of a face present in the first image, the tap on the face defining the edit area as including the location of the face.

6. The image editing system of claim 1, wherein the operations further comprise:
receiving a selection of an additional edit area of the first image; and
displaying a portion of a third image of the plurality of still images in the additional edit area of the first image; and
generating the modified image by further replacing the additional edit area of the first image with the portion of the third image.

7. A method comprising:
capturing, by a user device comprising one or more hardware processors, a plurality of still images using a successive image capturing process;
displaying, by the user device, a first image of the plurality of still images in a user interface presented in a display of the user device;
receiving, by the user device, a selection of an edit area of the first image, wherein the edit area is smaller than an area of the first image;
successively displaying, by the user device in the edit area of the first image, a corresponding portion of each of multiple images a second image of the plurality of still images;
in response to a selection of a first corresponding portion of the corresponding portion of each of the multiple images, replacing, by the user device, the edit area of the first image with the first corresponding portion to generate a modified image, the first corresponding portion corresponding to a second image of the plurality of still images; and storing the modified image in memory as an image file.

8. The method of claim 7, further comprising:

receiving an indication that a user has selected a capture button in a user interface displayed by the user device, the user device comprising an optical image capture device; and capturing, by the optical image capture device, the plurality of still images in response to the receiving the indication that the user has selected the capture button, wherein the plurality of still images are captured within a predetermined period of time.

9. The method of claim 7, further comprising:

detecting a selection of an edit area button in the user interface presented in the display of the user device; and detecting, by touch-sensitive components of the user device, a trace defining the edit area.

10. The method of claim 7, further comprising:

detecting a selection of an edit area button in the user interface presented in the display of the user device; and detecting, by touch-sensitive components of the user device, a tap on a location of a face present in the first image.

11. The method of claim 7, further comprising:

displaying an edit area image selection element permitting selection of any image of the plurality of still images as the second image;

receiving a selection of the second image; and determining the portion of the second image corresponding to the edit area.

12. The method of claim 7, further comprising:

receiving, by the user device, a selection of an additional edit area of the first image;

displaying a portion of a third image of the plurality of still images in the additional edit area of the first image, the portion of the third image corresponding to the additional edit area of the first image; and wherein replacing the edit area of the first image with the portion of the second image to generate a modified nominal image comprises replacing the additional edit area of the first image with the portion of the third image to generate the modified image.

13. The method of claim 12, further comprising detecting, by touch-sensitive components of the user device, a tap on a location of a face present in the first image, the detected tap on the location of the face defining the additional edit area.

14. The method of claim 7, wherein replacing the edit area of the first image with the portion of the second image to generate a modified image comprises applying a smoothing algorithm to account for a difference between the portion of the second image and the first image.

15. A non-transitory computer readable medium storing computer-executable instructions, that in response to execution by a system, causes the system to perform operations comprising:

capturing a plurality of still images in succession;

displaying a first image of the plurality of still images in a user interface presented in a display of a user device;

receiving a selection of an edit area of the first image, wherein the edit area is smaller than a total area of the first image;

successively displaying, in the edit area of the first image, a corresponding portion of each of multiple images of the plurality of still images;

in response to a selection of a first corresponding portion of the corresponding portion of each of the multiple images, replacing the edit area of the first image with the first corresponding portion to generate a modified image, the first corresponding portion corresponding to a second image of the plurality of still image; and the modified image in memory as an image file.

16. The computer readable medium of claim 15, wherein the operations further comprise:

receiving an indication that a user has selected a capture button on a user device comprising an optical image capture device in communication with a processing component; and capturing the plurality of still images in response to receipt of the indication that the user has selected the capture button, the plurality of still images being captured during a predetermined period of time.

17. The computer readable medium of claim 15, wherein the operations further comprise:

detecting a selection of an edit area button in the user interface presented in the display of the user device; and detecting, by touch-sensitive components of the user device, a trace that defines the edit area.

18. The computer readable medium of claim 15, wherein the operations further comprise:

detecting a selection of an edit area button in the user interface presented in the display of the user device; and detecting, by touch-sensitive components of a user device, a tap on a face present in the first image.

19. The computer readable medium of claim 15, wherein the operations further comprise:

detecting a selection of an additional edit area of the first image; and displaying a portion of a third image of the plurality of still images in the additional edit area of the first image, the portion of the third image corresponding to the additional edit area of the first image; and replacing the additional edit area of the first image with the portion of the third image to generate the modified image.

20. The computer readable medium of claim 15, wherein the operations further comprise smoothing a difference between the portion of the second image and the first image when replacing the edit area of the first image with the portion of the second image to generate the modified image.

* * * * *